United States Patent
Kessler et al.

(10) Patent No.: US 6,888,327 B1
(45) Date of Patent: May 3, 2005

(54) SYSTEM FOR PROTECTING A POWER SEMICONDUCTOR OUTPUT STAGE THAT SWITCHES AN INDUCTIVE LOAD

(75) Inventors: Martin Kessler, Brühl (DE); Stefan Koch, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 19 days.

(21) Appl. No.: 10/070,879

(22) PCT Filed: Jul. 25, 2000

(86) PCT No.: PCT/DE00/02421

§ 371 (c)(1),
(2), (4) Date: Jul. 10, 2002

(87) PCT Pub. No.: WO01/18950

PCT Pub. Date: Mar. 15, 2001

(30) Foreign Application Priority Data

Sep. 2, 1999 (DE) .......................... 199 41 698

(51) Int. Cl.⁷ ................................. H02P 6/00
(52) U.S. Cl. ................. 318/254; 318/701; 388/903
(58) Field of Search .................. 318/138, 254, 318/439, 700, 701, 720, 721, 722, 724; 388/903

(56) References Cited

U.S. PATENT DOCUMENTS

| | | | |
|---|---|---|---|
| 3,684,934 A | * 8/1972 | Loyzim | 318/696 |
| 4,164,696 A | 8/1979 | Kastilahn | |
| 4,270,075 A | * 5/1981 | Nygaard | 318/254 |
| 4,275,339 A | * 6/1981 | Burke et al. | 318/138 |
| 4,347,464 A | * 8/1982 | Park et al. | 318/254 |
| 4,374,347 A | 2/1983 | Mueller | |
| 5,291,115 A | * 3/1994 | Ehsani | 318/701 |
| 5,729,112 A | * 3/1998 | Blackburn | 318/701 |
| 5,844,343 A | * 12/1998 | Horst | 310/184 |
| 6,262,510 B1 | 7/2001 | Lungu | |
| 6,351,091 B1 | * 2/2002 | Heinkel et al. | 318/254 |
| 6,465,973 B1 | * 10/2002 | Kato et al. | 318/254 |

FOREIGN PATENT DOCUMENTS

| | | |
|---|---|---|
| DE | 30 10 435 | 9/1981 |
| DE | 36 34 990 | 6/1987 |
| DE | 296 22 254 | 4/1998 |
| GB | 2 185 169 | 7/1987 |
| WO | 93 23918 | 11/1993 |
| WO | WO 96/09683 | 3/1996 |

* cited by examiner

Primary Examiner—Bentsu Ro
(74) Attorney, Agent, or Firm—Kenyon & Kenyon

(57) ABSTRACT

A system for protecting a power semiconductor output stage that, as a function of a control signal, connects an inductive load to a direct-current supply voltage and disconnects it therefrom. Protection from the induced voltages is achieved, without a freewheeling diode, in that the disconnection energy occurring at the inductive load upon disconnection can be transferred in transformer fashion to an additional inductance that is loaded with a resistance or is coupled in the countercurrent direction to the direct-current supply voltage.

2 Claims, 1 Drawing Sheet

SYSTEM FOR PROTECTING A POWER SEMICONDUCTOR OUTPUT STAGE THAT SWITCHES AN INDUCTIVE LOAD

FIELD OF THE INVENTION

The present invention relates to a system for protecting a power semiconductor output stage that, as a function of a control signal, connects an inductive load to a direct-current supply voltage and disconnects it therefrom.

BACKGROUND INFORMATION

Series circuits of this kind, made up of a power semiconductor output stage and inductive load, are used for a variety of applications. The control signal always fully drives the power semiconductor output stage in order to minimize its power dissipation. When the power semiconductor output stage is disconnected, there occurs at the inductive load a disconnection energy $W=\frac{1}{2} LI^2$ that must be kept away from the power semiconductor output stage, since by way of the latter's parasitic diode the energy would generate a current flow that could result in overload or destruction of the power semiconductor output stage. To prevent this, the load is connected in parallel with a so-called freewheeling diode, which constitutes a power diode and must be matched to the switched power of the series circuit, and is therefore very expensive.

As described in International Patent Publication No. WO 96/09683, it is also known in the context of electronically commutatable motors to incorporate into the freewheeling circuit of an excitation winding the respective excitation winding that is to be energized next, and thereby already to achieve premagnetization. This system nevertheless still requires the freewheeling diode as a coupling diode between the excitation windings.

SUMMARY OF THE INVENTION

It is an object of the present invention to provide a system of the kind mentioned initially that, without a freewheeling diode, protects the power semiconductor output stage from, and dissipates, the disconnection energy $W=\frac{1}{2} LI^2$ of the inductive load.

This object is achieved, according to the present invention, in that the induced voltage occurring at the inductive load upon disconnection can be transferred in transformer fashion to an additional inductance that is loaded with a resistance or is coupled in the countercurrent direction to the direct-current supply voltage.

Upon disconnection of the series circuit, the disconnection energy is transferred to the additional inductance, i.e. to a circuit separate from the series circuit, and dissipated through a load. By appropriate coupling of the additional inductance, the energy released can also be transferred back to the direct-current supply voltage. Relevant inductive loads are switching relays, contactors, electronically commutatable motors, and the like.

In the context of a switching relay and a contactor, in simple fashion the design is such that the inductive load and the additional inductance are configured as coils wound in opposite directions having a common magnetic circuit.

For an electronically controllable motor, the additional inductance for an energized energy winding is the oppositely energized excitation winding that is respectively next in the commutation cycle. Particularly simple circuits result if low-side-connected N-channel MOSFETs are used as power semiconductor output stages.

DETAILED DESCRIPTION

Figure 1:
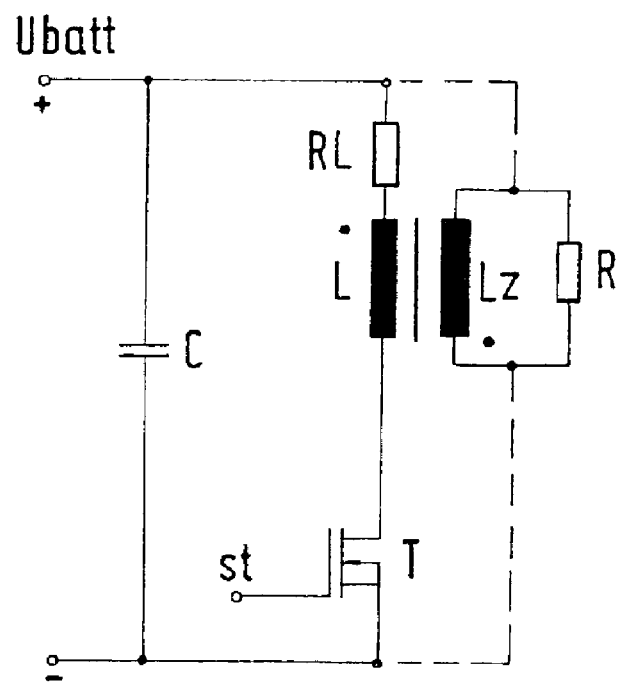
FIG. 1 shows a system having a switching relay switched by way of a power semiconductor output stage.

The exemplary embodiment according to FIG. 1 uses an N-channel MOSFET, labeled T, to switch on and disconnect inductive load L. Activation is performed with a control signal st that, when present, fully drives power semiconductor output stage T so that the latter's power dissipation is minimal and the maximum current can flow through load L with load resistance RL. In this context, practically the entire direct-current supply voltage Ubatt drops across load L. When power semiconductor output stage T is no longer being activated because control signal st is disconnected, it then assumes the high-resistance switching state in which the parasitic diode of the power semiconductor output stage could constitute a circuit for the induced voltage of load L.

In order to greatly reduce any current flow therethrough, the induced voltage is transferred to an additional inductance Lz that is coupled in transformer fashion to load L, i.e. load L and additional inductance Lz are opposite-direction windings with a common magnetic circuit. If additional inductance Lz is loaded with a resistance R, the induction energy is thereby dissipated. The energy can also, however, as shown by the dashed lines of FIG. 1, be transferred back in the countercurrent direction to direct-current supply voltage Ubatt with smoothing capacitor C that is connected in parallel.

Figure 2:
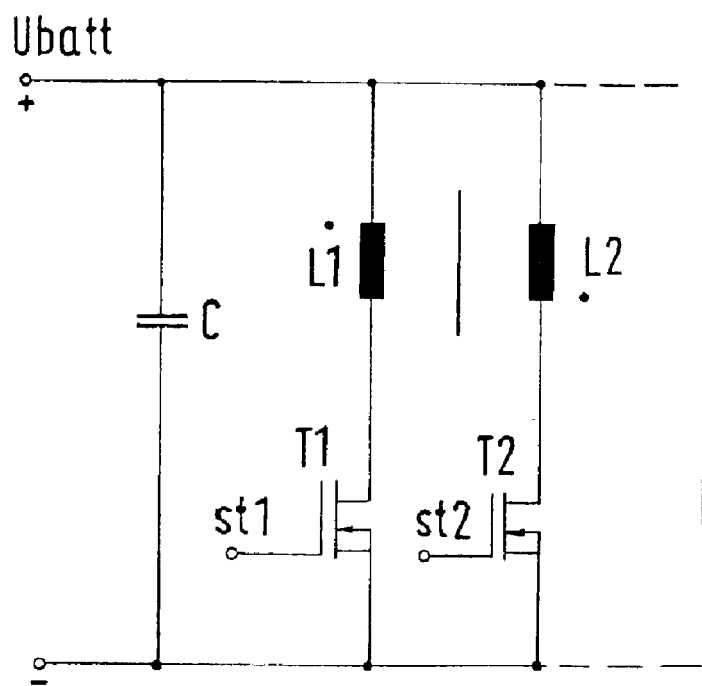
FIG. 2 shows a system having an electronically commutatable motor with four poles and two winding phases as excitation windings.

The circuit diagram according to FIG. 2 shows, as inductive loads L1 and L2, the two excitation windings of an electronically commutatable motor. Loads L1 and L2 are alternatingly energized in the commutation cycle; the energization direction of the excitation windings changes from step to step, since they are incorporated into the series circuits with windings in opposite directions. In the commutation cycle, power semiconductor output stages T1 and T2 are acted upon with the successive control signals st1, st2, st1, st2, ... Upon energization of load L1, load L2 that is coupled in transformer fashion acts as additional inductance Lz, while upon energization of load L2, load L assumes the function of additional inductance Lz. In each energization phase, the circuit shown in FIG. 2 operates like the circuit of FIG. 1, so that here again freewheeling diodes are not necessary at loads L1 and L2 (i.e. the excitation windings of the motor), and power semiconductor output stages T1 and T2 are protected from the induced voltages occurring upon disconnection.

What is claimed is:

1. An electronically commutatable motor comprising:
   a plurality of excitation windings having a common magnetic circuit;
   a corresponding plurality of power semiconductor output stages, the output stages including low-side-connected N-channel MOSFETs,
   wherein each of the excitation windings is connected in a series circuit integrally with a respective one of the MOSFETs, the excitation windings being connected to a common direct-current supply voltage, the excitation windings being energized successively in a commutation cycle and being situated alternatingly in opposite directions into the series circuits with the MOSFETs, wherein, in the context of more than two excitation windings, the commutation cycle extends over an even number of successive, alternatingly oppositely polarized excitation windings, and wherein, in associated commutation phases, the MOSFETs are driven fully into a conductive state with uniform control signals; and a smoothing capacitor connected in parallel to the series circuits of the MOSFETs and windings between the voltage and ground for transferring back, in a countercurrent direction to the direct-current supply voltage, a disconnection energy transferred in a transformer fashion, upon disconnection of the excitation windings, to a respectively next energizable excitation winding.

2. An electronically commutatable motor comprising:

a plurality of excitation windings having a common magnetic circuit;

a corresponding plurality of power semiconductor output stages, the output stages including low-side-connected N-channel MOSFETs, each of excitation winding connected in a series circuit integrally with a respective one of the MOSFETs, the excitation windings connected to a common direct-current supply voltage, the excitation windings energizable successively in a commutation cycle and arranged alternatingly in opposite directions into the series circuits with the MOSFETs, in the context of more than two excitation windings, the commutation cycle extends over an even number of successive, alternatingly oppositely polarized excitation windings, in associated commutation phases, the MOSFETs drivable fully into a conductive state with uniform control signals; and a smoothing capacitor connected in parallel to the series circuits of the MOSFETs and windings between the voltage and ground arranged to transfer back, in a countercurrent direction to the direct-current supply voltage, a disconnection energy transferred in a transformer fashion, upon disconnection of the excitation windings, to a respectively next energizable excitation winding.

* * * * *